UNITED STATES PATENT OFFICE.

EDELMIRO BORRÁS, OF BARCELONA, SPAIN.

PREPARATION OF POTATO-PEELINGS FOR THE PURPOSE OF THEIR INDUSTRIAL UTILIZATION.

1,226,852.     Specification of Letters Patent.     Patented May 22, 1917.

No Drawing.     Application filed June 17, 1916. Serial No. 104,240.

*To all whom it may concern:*

Be it known that I, EDELMIRO BORRÁS, a subject of the King of Spain, residing at 20 Aribau, Barcelona, Spain, have invented certain new and useful Improvements Relating to the Preparation of Potato-Peelings for the Purpose of Their Industrial Utilization, of which the following is a specification.

For the purpose of utilizing potato peelings various processes may be employed and among them the more important are those for preparing the peelings in order to render them into such condition that the starch contained in the peelings may be utilized.

Ordinarily these processes have for their object to separate the skin from the adhering substance but the process of the inventing has for its object to treat the peelings by conserving them during treatment in their integrity without this separation and to transform them into a substance suitable for utilization.

The process in question consists essentially in cooking or boiling the peelings at a temperature of about 100° C. or more by any suitable means as for example with water or with steam.

After the boiling or cooking the peelings are dried in a stove and at a temperature gradually raised for example from 60 to 130° C., for obtaining a product having a degree of hardness and brittleness which permits of its being effectively pulverized, the process terminating at this stage.

This product may be reduced to a more or less fine condition of powder or to a granular or farinaceous condition by trituration or grinding.

The product obtained by this process may be utilized for the manufacture of glucose, alcohol, or other derivatives or products.

I claim:—

A process for the preparation of potato peelings for the purpose of their industrial utilization consisting essentially in treating the peelings by cooking them and then drying the treated peelings in stoves to obtain a product having a degree of hardness and brittleness which permits of its being pulverized for utilization in the manufacture of glucose, alcohol and various other industrial products, substantially as described.

EDELMIRO BORRÁS.

Copies of this patent may be obtained for five cents each, by addressing the "Commissioner of Patents, Washington, D. C."